May 28, 1946.  J. B. BENNETT ET AL  2,400,973
METHOD OF MAKING RUBBER WHEELS
Original Filed Nov. 3, 1943
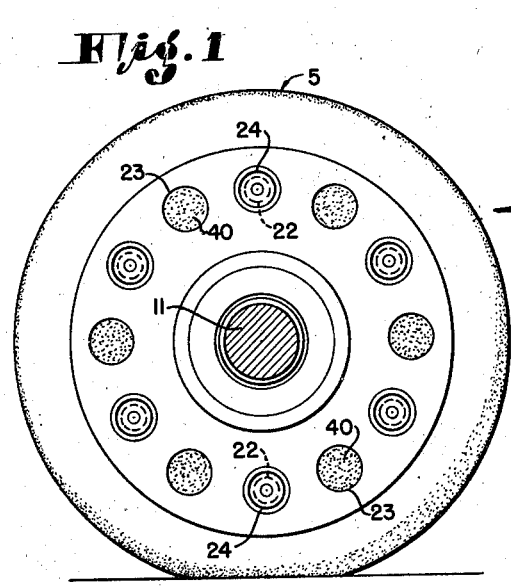
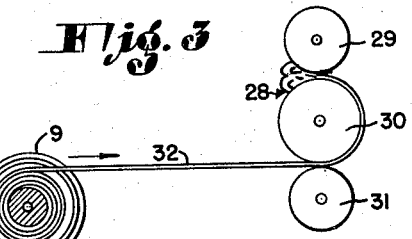
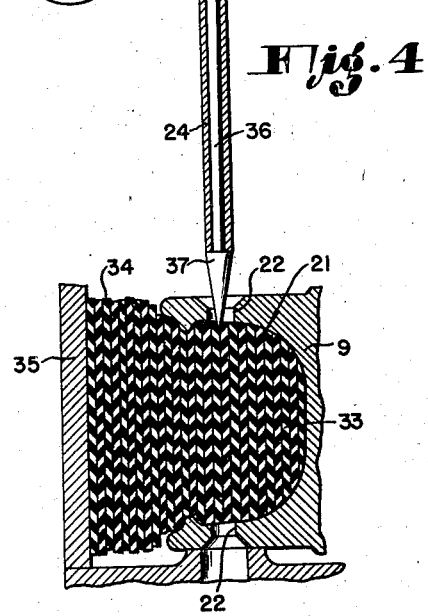
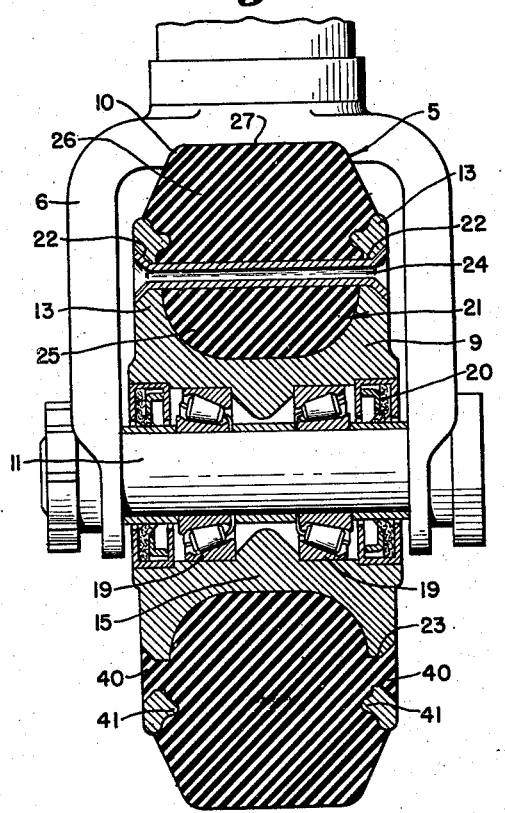
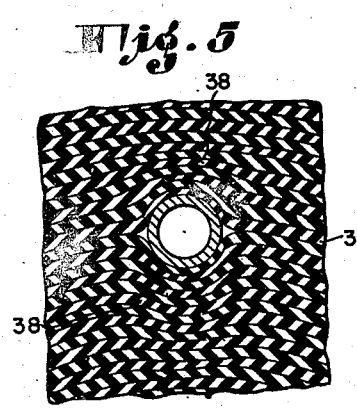
Inventors
JAMES B. BENNETT
JOHN J. McCARTER
By
Attorney Patented May 28, 1946

2,400,973

UNITED STATES PATENT OFFICE 2,400,973

METHOD OF MAKING RUBBER WHEELS

James B. Bennett, Los Angeles, and John J. McCarter, Alhambra, Calif., assignors, by mesne assignments, to Thermoid Company, Trenton, N. J., a corporation of Delaware Original application November 3, 1943, Serial No. 508,791. Divided and this application July 31, 1944, Serial No. 547,359½

7 Claims. (Cl. 154—12)

This invention relates to wheels having resiliency, such as rubber wheels, and relates in particular to the making of a wheel having especial utility as a tail wheel for aircraft by reason of its exceptional durability.

The present application is a division of our accompanying application Serial No. 508,791, filed November 3, 1943 for Rubber wheel.

Although this method may be employed for making wheels having other uses, for example, as a wheel or roller for trucks and the like, an object of the present invention is to provide a method for making a tail wheel for aircraft which is capable of giving satisfactory service over a long period of use, as compared to the service now being obtained from rubber-tired tail wheels. Serious difficulty is now being encountered in the use of tail wheels adopted as standard equipment on small aircraft. The severe conditions of service to which these tail wheels are subjected causes them to break down in relatively short periods of time so that frequent replacement is necessary. In may instances it has been found necessary to remove and replace a tail wheel after it has made only one landing on the deck of an aircraft carrier. Our present invention constitutes an important contribution for the reason that it eliminates the unsatisfactory condition expressed in the foregoing.

In keeping with the foregoing, it is an object of the invention to provide a method for making a tail wheel having its parts in such cooperative relation that a durability is achieved which will make possible a minimum number of landings from a wheel ordinarily considerably in excess of one hundred.

When an aircraft lands at a speed of 75 miles per hour, a six-inch tail wheel thereon is caused to revolve at a velocity of over 4000 revolutions per minute. This means that each portion of the periphery is deformed, often under heavy loading, with such rapidity that heat is generated within the rubber and stresses are applied which tend to disintegrate the rubber and tear it looose from its supporting wheel or hub. This is the reason that attempts to use wheels with solid rubber tires or pneumatic tires have failed, as only relatively few landings can be made with such wheels before it becomes necessary to replace the wheel.

It is an object of this invention to provide a method for making a solid rubber tail wheel in which the unit deformation of the rubber entering therein is decreased, and the deformation is distributed to such an extent that even at high speed rotation in contact with a landing deck or field, the rubber will not be over-worked in a manner to cause early failure of the wheel. In one manner of explanation, the present invention may be described as a method for making a tail wheel, the greater portion of which comprises elastic material which is disposed in such a way that the shock of deformation when the wheel is actively in use is absorbed without overworking of the rubber.

A further object of the invention is to provide a method for making a tail wheel formed substantially entirely of rubber, with side members to guide or support the side faces of the rubber wheel, these supporting members being characterized by their ability to permit lateral expansion or flow of the rubber, or, in other words, a breathing of the rubber in lateral direction, during use of the wheel in making a landing.

A further object of the invention is to provide a method for making a tail wheel, substantially of rubber, with reenforcing elements at the sides thereof which have locking engagement with a portion of the rubber in the wheel so as to limit and control outward movement thereof, without preventing ample deformation of the rubber to avoid over-working and rapid failure such as referre dto in the foregoing.

A further object of the invention is to provide a method for making a tail wheel having an inner supporting member with radial walls or flanges defining an annular channel, and an annular body of rubber molded in place in this channel so as to be bonded to the walls forming the channel, with means for locking the annular body of rubber in the channel, yet permitting deformation or working of the rubber to such extent that a long period of operation of the tail wheel is achieved.

A further object of the invention is to provide a method of making a wheel of the character described wherein the supporting structure of the wheel provides an annular channel with bars extending across this channel spaced from the bottom of the channel, with a rubber body of annular form, having an inner annular portion and an outer annular portion lying respectively within and outside the space defined by the bars, and being bonded together in the spaces between the bars. A further object of the invention is to provide a process for making a wheel of the character described wherein the rubber body comprises circular laminations of relatively thin or slender rubber material having its grain structure running circumferentially, consecutive laminations being bonded together and cured in place.

A further object of the invention is to provide a method for making a tail wheel of the character set forth in the preceding two paragraphs wherein the laminations or wraps of rubber adjacent the bars flow or curve around the bars and are bonded together in the spaces between the bars.

Further objects and advantages of the invention will be brought out in the following part of the specification.

Referring to the drawing which is for illustrative purposes only,

Fig. 1 is a side view of a wheel constructed according to our method.

Fig. 2 is an enlarged sectional view of the wheel taken on the line 2—2 of Fig. 1. Fig. 2 also shows a yoke or fork such as used for supporting the wheel.

Fig. 3 is a schematic view showing the manner in which the rubber is formed initially into an approximate annular body.

Fig. 4 is a fragmentary sectional view showing the manner the bars are applied after the rubber is initially placed.

Fig. 5 is an enlarged fragmentary section showing the manner in which the lamina of rubber flow or curve around a cross bar of the wheel structure.

In the drawing the wheel 5 illustrated has a form in which it is suited for use as a tail wheel for an aircraft. When so used, the wheel 5 is ordinarily supported by a caster (or fork 6) so that it may be projected below the tail portion of the aircraft fuselage. As shown in Fig. 2, the wheel includes a body 10 of rubber arranged to rotate around an axle 11 and having supporting means consisting of side plates or flanges 13 and a tubular metal wall 15 cooperating so as to form a hub in which anti-friction bearings 19 support the wheel 5 for rotation on the axle 11, there being grease seals 20 at the ends of the tubular wall portion 15.

The inner tubular wall portion 15 and the flanges 13 define an annular channel 21. In the flanges 13 there are aligned openings 22 and 23 arranged so as to define a circle, and being spaced outward from the bottom of the channel 21. The openings 22 and 23 are disposed in alternate order, and the outer ends of these openings are countersunk or flared as shown. Through the openings 22 pins 24 are extended, these pins projecting through the annular rubber body 10 and having the ends thereof expanded so as to be connected to the flanges 13 in a manner to resist separation of the flanges 13.

The pins 24 are placed on a circular line or cylindric surface which divides the rubber body 10 into an inner portion 25 and an outer portion 26, this outer annular portion 26 of the body 10 projecting beyond the periphery of the flanges 13 so as to provide a rubber tread 27 for the wheel, which tread is supported in the wheel structure on an annular mass of rubber having considerable thickness, and therefore ample ability as a cushion to absorb the shocks received by the tread. The pins or bars 24 lock the rubber body 10 in the channel 21 and also prevent sliding of the rubber body 10 in the channel or rotation of the body 10 relatively to the metal support which forms the channel 21. The inner annular portion 25 of the rubber body 10 is, however, connected to the outer annular portion 26 in the spaces between the pins or bars 24.

In accordance with our method, we wrap the wheel hub in its medial plane with a band of elastic material and secure the wraps together to form an integrated body. This is preferable and accomplished by employing a vulcanizable material.

Our new method of manufacturing a wheel of the character described is as follows: The wheel hub 9 is supported for rotation adjacent a device 28, Fig. 3, for forming a long slender rubber element suitable for winding in the channel 21 of the hub 9. For this purpose we have diagrammatically shown the device 28 as comprising a calender having rollers 29, 30, and 31. In the operation of the device 28 a strip or strand of rubber 32 is fed forward, and this is wound in a continuous spiral in the channel 21 of the hub 9, as shown in Fig. 3. The normal tension exerted in the rubber element 32 in the ordinary process of winding the same causes each turn of the spiral to be pulled tightly down against the preceding turn, and since each succeeding turn is under tension, the interior portion of the mass of rubber wound on the spool or hub 9 is under compression, which, however, is slight.

The rubber element 32 is ordinarily in the form of a flat band or ribbon, and the width of this ribbon is varied in accordance with the variations in the width of the channel 21, and then after the channel 21 is completely filled with raw rubber compound by this winding process, the strip is widened and the winding process is continued for the purpose of applying an external band of rubber which will enter into the formation of the tread 27. The foregoing is illustrated in Fig. 4 which shows laminations of uncured rubber compound ribbon 33 substantially filling the channel 21 with wider laminations 34 externally disposed to provide tread stock.

After the crude rubber is wound in place, the unit thus formed is weighed so as to check on the amount of rubber. The amount of rubber ordinarily applied in the winding process is generally slightly in excess of the requirement so that a surplus of rubber will be provided which may be trimmed down to give the required weight of rubber stock. The unit, as shown in Fig. 4, is then placed inside a metal ring 35 and the pins 24 are applied. It will be noted that these pins 24 have axial openings, and, as shown in Fig. 4, the stem 36 of a spear 37 is projected into the opening of a pin 24, and then downward force is applied to move the spear downward from the position in which it is shown in Fig. 4 through one of the openings 22, then through the uncured rubber occupying the channel 21, and finally through the aligned lower opening 22, the pin 24 following the spear so that when the spear is withdrawn after it is passed through the lower opening 22, the pin 24 will be left in place and may be later headed or expanded at the ends so as to have the form thereof shown in Fig. 2. Rubber cement is ordinarily applied first to the spear and to the pin 24, which rubber cement will serve as a lubricant. As shown in Fig. 5, the action of the spear 37 is to separate the laminations so that the portions thereof adjacent the pins 24 will flow or curve around the outer surfaces of the pins 24 as shown at 38 in Fig. 5. The rubber layers at this point being considerably elongated may be thinned out to such an extent that it is difficult to illustrate in Fig. 5. The laminations which enter into the inner and outer portions 25 and 26 of the rubber body 10 are bonded together in the spaces between the pins 24 as shown at 39 in Fig. 5. By reason of the process employed, the grain in the rubber in the annular body 10 extends substantially circularly around the axis of the rotation of the wheel, and in the rubber body 10 great durability is achieved.

After placement of the pins 24 as illustrated in Fig. 4, the ends of the pins are flared, and the unit is then placed in a mold and cured under heavy pressure, thereby producing a homogeneous rubber body 10 and forcing portions of the rubber out through the openings 23 so as to fill the same, as shown in the lower part of Fig. 2. The rubber bodies 40 thus formed in the openings 23 cooperate with annular beads 41, which project inwardly from the flanges 13 near the peripheries thereof, in locking the rubber body 10 in the channel of the hub 9. The openings 23 also provide for a lateral breathing or expansion of the rubber of the body 10 when compressive forces are radially applied. This is particularly desirable where the load on the wheel is suddenly applied when the airplane carrying it lands on a deck or a runway.

Other embodiments of the invention may be resorted to without departing from the spirit of the invention.

We claim as our invention:

1. A method of making a wheel having a resilient body which includes: wrapping a band of elastic material around a rigid wheel hub in the medial plane of the hub, effecting connection of the wraps to each other to integrate them into a solid body, and providing openings in the flanges into which the elastic body may expand to relieve the compression stresses in the resilient body that may be developed therein by a suddenly applied load.

2. The method of making a rubber wheel having an inner supporting means with radial walls defining an outwardly faced annular channel, said radial walls having aligned openings therein spaced outwardly from the bottom of said channel, comprising: winding spirally in said channel an uncured rubber strand having a longitudinal grain under tension in said channel from the bottom outward so as to fill the same and continuing said winding radially beyond the peripheries of said flanges so as to provide stock for a tread for the wheel; passing a pointed member through said openings in said radial walls and through the rubber wound in said channel to separate the turns of the rubber strand and following said pointed member with a pin; expanding the ends of said pins so that said pins will tie said radial wall together; and curing said rubber while the peripheral portion thereof is in a mold to form the projecting portion of the rubber into a tread.

3. The method of making a rubber wheel having an inner supporting means with radial walls defining an outwardly faced annular channel, said radial walls having aligned openings therein spaced outwardly from the bottom of said channel, comprising: winding spirally in said channel an uncured rubber strand having a longitudinal grain under tension in said channel from the bottom outward so as to fill the same and continuing said winding radially beyond the peripheries of said flanges so as to provide stock for a tread for the wheel; passing a pointed member through said openings in said radial walls and through the rubber wound in said channel to separate the turns of the rubber strand and following said pointed member with a pin; and curing said rubber while the peripheral portion thereof is in a mold to form the projecting portion of the rubber into a tread.

4. The method of making a rubber wheel having an inner supporting means with radial walls defining an outwardly faced annular channel, said radial walls having aligned openings therein spaced outwardly from the bottom of said channel, including: winding spirally in said channel an uncured band of vulcanizable rubber in said channel from the bottom outwardly so as to fill the same and continuing said winding radially beyond the periphery of said flanges so as to provide stock for a tread for the wheel; passing a pointed member through said openings in said radial walls and between layers of said band of rubber and following said pointed member with a pin; securing said pin to said flanges; and curing said rubber while the peripheral portion thereof is in a mold to form the projecting portion of the rubber into a tread.

5. The method of making a rubber wheel having an inner supporting means with radial walls defining an outwardly faced annular channel, said radial walls having aligned openings therein spaced outwardly from the bottom of said channel, including: winding spirally in said channel an uncured band of vulcanizable rubber in said channel from the bottom outwardly so as to fill the same and continuing said winding radially beyond the periphery of said flanges so as to provide stock for a tread for the wheel; passing a pin through said openings in said radial walls and between layers of said wound band of rubber; securing said pin to said radial walls; and curing said rubber while the peripheral portion is in a mold to cause it to be formed into a homogeneous body of rubber and to form the projecting portion of the rubber into a tread.

6. The method of making a rubber wheel having an inner supporting means with radial walls defining an outwardly faced annular channel, including: winding spirally in said channel an uncured band of vulcanizable rubber in said channel from the bottom outwardly so as to fill the same and continuing said winding radially beyond the periphery of said flanges so as to provide stock for a tread for the wheel; separating adjacent layers of said wound band of rubber to provide a space; passing a pin through said space between said layers; securing said pin to said radial walls; and curing said rubber while the peripheral portion is in a mold to cause it to be formed into a homogeneous body of rubber and to form the projecting portion of the rubber into a tread.

7. The method of making a rubber wheel having an inner supporting means with radial walls defining an outwardly faced annular channel, including: winding spirally in said channel an uncured band of vulcanizable rubber in said channel from the bottom outwardly so as to fill the same and continuing said winding radially beyond the periphery of said flanges so as to provide stock for a tread for the wheel; separating adjacent layers of said wound band of rubber to provide a space; passing a pin through said space between said layers; securing said pin to said radial walls; and curing said rubber while the peripheral portion is in a mold which confines said rubber and applies pressure to it to cause said rubber to be formed into a homogeneous body of rubber and to vulcanize said body of rubber to the walls of said outwardly faced annular channel and to said pin.

JAMES B. BENNETT.
JOHN J. McCARTER.